2 Sheets—Sheet 1.

G. B. & A. B. WOODARD.
CARRIAGE WHEEL.

No. 43,651.          Patented July 26, 1864.

Witnesses:

Inventors:

2 Sheets—Sheet 2.

G. B. & A. B. WOODARD.
CARRIAGE WHEEL.

No. 43,651. Patented July 26, 1864.

Witnesses:

Inventors:

UNITED STATES PATENT OFFICE.

GEORGE B. WOODARD, OF BOLIVAR, AND A. B. WOODARD, OF ALFRED CENTRE, NEW YORK.

IMPROVEMENT IN CARRIAGE-WHEELS.

Specification forming part of Letters Patent No. 43,651, dated July 26, 1864.

*To all whom it may concern:*

Be it known that we, GEORGE B. WOODARD, of Bolivar, in the county of Allegany and State of New York, and A. B. WOODARD, of Alfred Centre, in the county of Allegany and State of New York, have invented certain Improvements in Suspension Carriage-Wheels, of which the following is a specification.

Our invention relates to the manner in which the spokes or tension-rods are inserted and secured in the hub.

Figure 1:
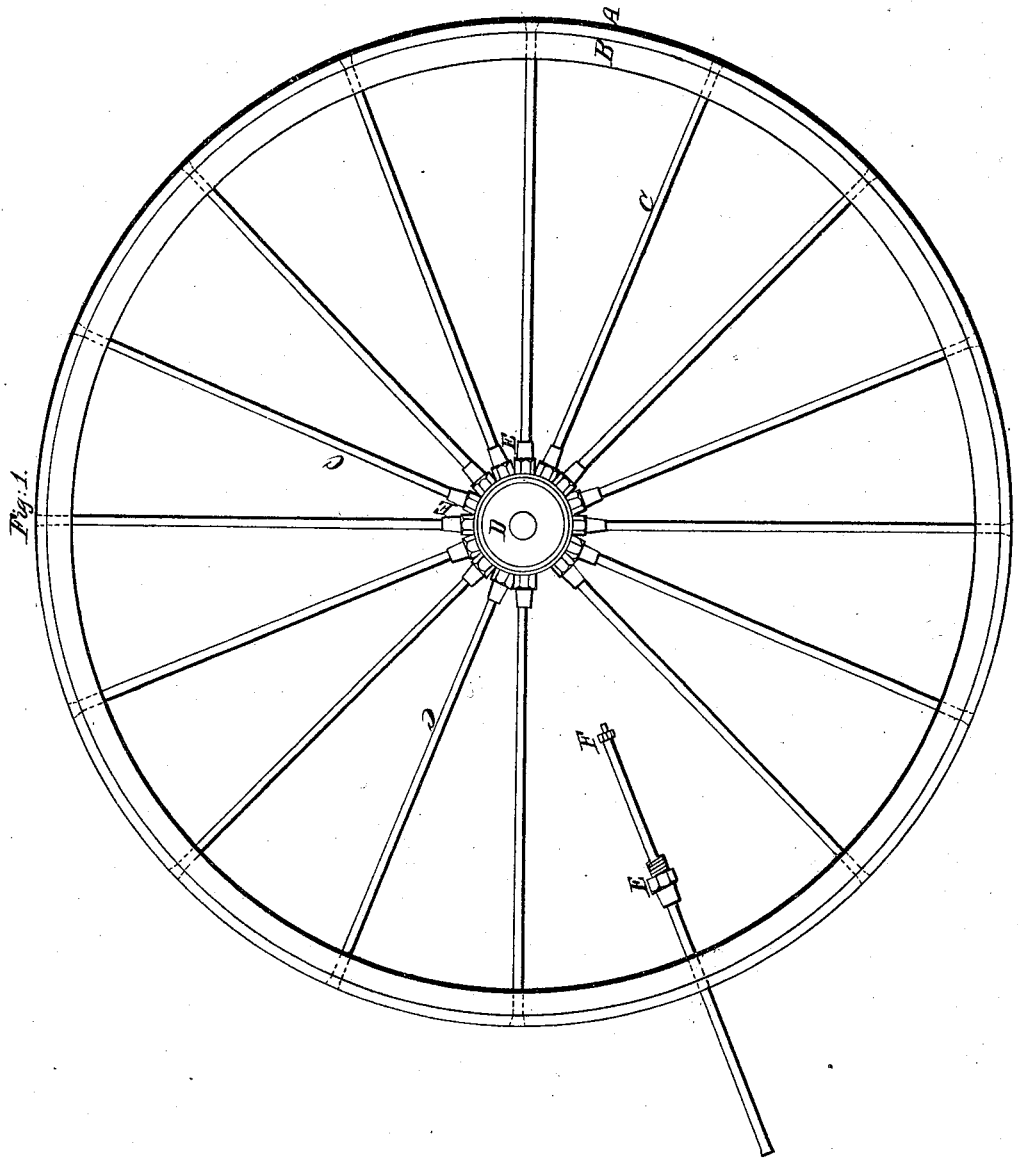
Figure 2:
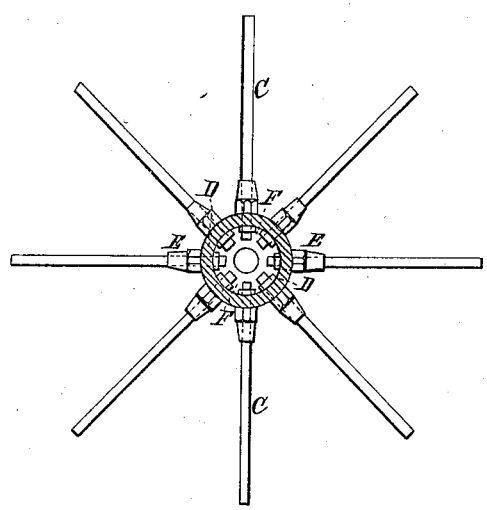
Figure 3:
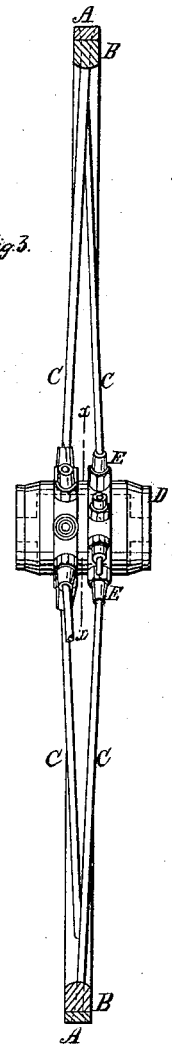

In the drawings, Figure 1 is a side view of the wheel. Fig. 2 is a vertical section of the hub through the line $x\ x$, and Fig. 3 is an edge view of the wheel with part of the tire, fellies, and spokes or tension-rods removed.

A is the tire of the wheel.

B are the fellies.

C are the spokes or tension-rods, which pass through the fellies and also through the tire. The heads of the spokes or tension-rods, or the part of said spokes or tension-rods which passes through the tire, are made cone-shaped, so that however thin the tire may be worn there are still heads on the spokes or tension-rods to keep the tire in its place. Upon the other end of the spokes or tension-rods is cut a screw-thread, upon which is screwed a small nut, F, said nut being sufficiently small to pass through the holes in the hub through which the ends of the spokes or tension-rods pass. The use of this nut is for the ends of the thimble-nuts E to press against and strain or tighten the spokes or tension-rods.

Upon the outside of the part of the thimble-nuts E which enters the hub is cut a screw-thread, which fits into a thread cut on the inside of the holes in the hub through which the ends of the spokes or tension-rods pass. The threads on the thimble-nuts E and in the small nut F must be cut in such a way that when the spokes or tension-rods are strained or tightened the pressure of the thimble-nuts E upon the nuts F will tend to screw the nut F on and not off the ends of the spokes or tension-rods. A portion of the part of the thimble-nuts E which is outside of the hub is made with plain surfaces, so that a wrench may take hold of them to screw them in or out of the hub, as occasion may require. By this arrangement the spokes or tension-rods are strained and held in their places by the pressure of the lower ends of the thimble nuts E upon the small nuts F, and the spokes or tension-rods are at the same time free to pass inward toward the center of the hub, except as restrained by the general tension and resistance of the wheel, thus removing the effect of a concussion between the wheel and any obstruction in the road from the individual spoke or tension-rod near the end of which the concussion occurs, and distributing said effect through the adjacent parts of the wheel. The rim of the wheel is directly over the center of the hub, as represented in Fig. 3, and the spokes are set alternately inclined in opposite directions, so as to brace the wheel and give it additional strength. The part of the hub D into which the spokes or tension-rods C enter is raised up or has a greater diameter than the rest of the hub, to give more strength to the hub and allow a chamber to be hollowed out beneath said raised part for the reception of the ends of the spokes or tension-rods and the nuts thereon, as represented in Figs. 2 and 3.

We claim—

The combination, in a suspension carriage-wheel, of the thimble-nuts E and the small nuts F with the spokes or tension-rods C and the hub D, substantially as and for the purpose set forth.

G. B. WOODARD.
A. B. WOODARD.

Witnesses:
W. C. BURDICK,
C. M. ALLEN.